Oct. 25, 1932.                H. RASKIN                1,884,228
                          GUARD FOR VEHICLES
                          Filed June 18, 1930
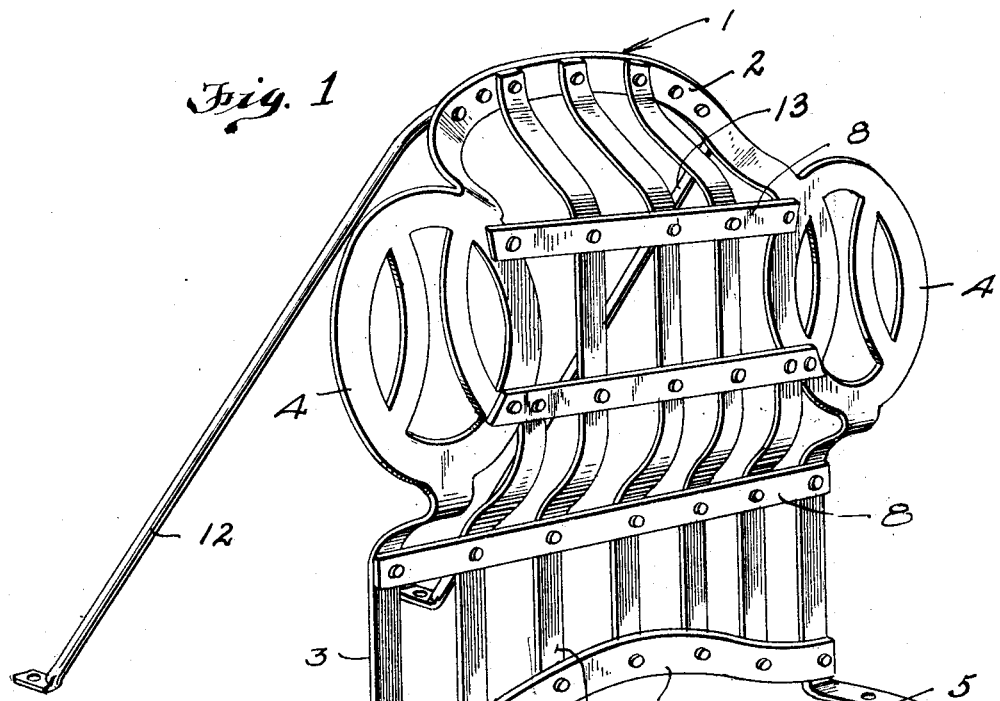
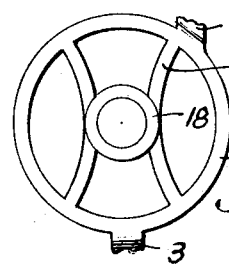
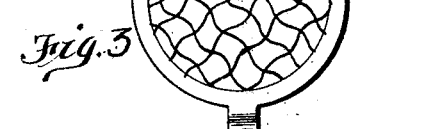
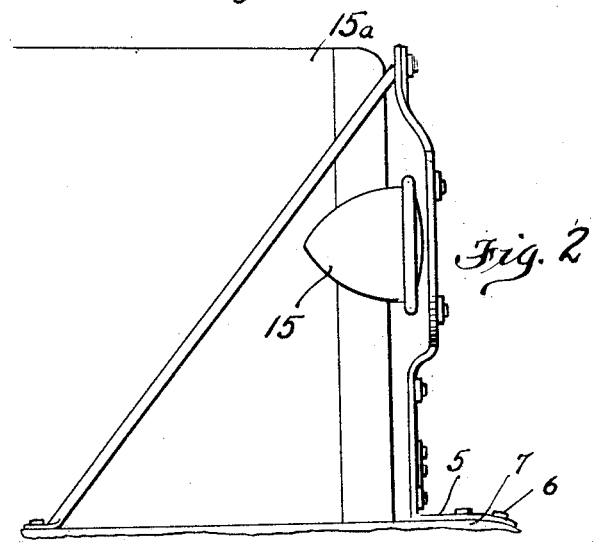
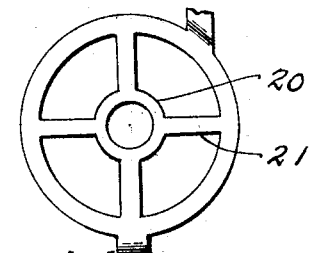
INVENTOR.
HARRY RASKIN
BY
ATTORNEYS Patented Oct. 25, 1932

1,884,228

UNITED STATES PATENT OFFICE

HARRY RASKIN, OF NEW YORK, N. Y.

GUARD FOR VEHICLES

Application filed June 18, 1930. Serial No. 462,080.

This invention relates to protective devices for vehicles, and more particularly to protective means for the radiator and headlights of automobiles, trucks, and the like.

One object of this invention is to provide simple and practical protective means for the radiator and headlights of motor vehicles in the event of collision. Another object is to provide an easily manufactured device to protect the air ventilated portion of radiators from objects such as pipes or lumber protruding from the rear of advance vehicles. Another object is to provide guards for headlights of such design and strength as to protect the headlight lens from flying objects such as stones. Another object is to provide durable means to protect the front portions of a vehicle from damage in the event of collision with the overhanging rear end of advance vehicles, such as trucks as commonly constructed.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawing depicting several modifications of the invention has been annexed as part of this disclosure, and in such drawing, like characters of reference denote corresponding parts throughout all of the views, in which—

Fig. 1 is a front perspective view of the device in accordance with my invention;

Fig. 2 is a side elevation of the device as installed;

Figs. 3, 4 and 5 show various modifications of the headlight guards.

The drawing shows a preferred construction of a guard or protective device in accordance with my invention, although it will be understood that various modifications or substitutions may be resorted to if found more convenient, without departing from the spirit thereof.

The material used in the illustrated construction is preferably heavy steel because of its relative cheapness, or some other durable metal stripping, such as wrought or cast iron, or brass, and of sufficient strength to withstand severe stress in the event of collision. For convenience, heavy stripping about one-quarter of an inch in thickness is employed, although I do not wish to limit the construction to any specific dimension.

Referring to Fig. 1, I provide a heavy primary frame 1 constituted by an upper arch portion 2, vertical legs 3, and annular or circular guard elements 4 interposed between the arch portion 2 and legs 3, and preferably welded thereto to provide a solid unitary structure, having a general inverted U-shape contour.

The lower ends of the legs 3 terminate in integral extensions 5 which project relatively forwardly of the frame 1 and provide a means of securing the frame to the chassis frame 7, as by means of bolts 6 or the like (Fig. 2).

Extending across the frame 1, I provide horizontal bracing strips 8, four being shown by way of illustration, and preferably spaced substantially equidistantly from each other. The lower bar or strip 8 has a portion raised from the horizontal as at 8a, permitting the crank shaft end to extend beyond the frame 1. I also provide vertical bars or strips extending from the lower cross bar 8, and secured to the intermediate bars 8 and to the arch member 2 as by riveting or the like.

The guard as described has a portion extending forwardly of its normal plane which is the plane of arch member 2 and the lower horizontal bar 8, the forwardly extending portion generally including the horizontal zone of the circular light guards 4. The legs of the arch portion 2, the side legs 3 and the vertical bars 10 are bent forwardly and merge into the plane of the circular guards 4, as indicated.

Referring to Figs. 1 and 2, there is provided a rear supporting brace preferably comprising inclined rods 12, 13, each secured as by rivets to the arch 2 and extending rearwardly and downwardly for attachment to the chassis frame 7 by bolts or the like. My entire protective device is so positioned upon installation that it will rest at a convenient distance in advance of the headlights 15 and radiator 15a to allow for any slight bending in the event of collision. The said supporting braces 12, 13 serve to support the frame 1 in a substantially vertical plane, while the extensions 5 function to provide a relatively extended support therefor while at the same time acting as forward bracing elements.

Figs. 3, 4 and 5 illustrate various modifications of elements to be disposed across the substantially circular headlight guards 4. In Fig. 3, steel strips 16 are interwoven to form a mesh as shown, thus affording adequate protection to the lens of the headlight from flying or protruding objects. Fig. 4 shows a further modification comprising steel strips 17 supporting an interior circular member 18, thus allowing passage of light rays from the headlights. Fig. 5 shows another modification in which the interior circular protecting element 20 is joined to the outer guard 11 by radial connecting strips 21.

In use, the device in accordance with the present invention affords ample protection for both radiator and headlights in case of collision of any sort. By the arrangement of the frame and the various steel strips to each other and functioning as a protecting network, the front portions of the car are materially protected against objects such as pieces of lumber or pipe protruding from advance vehicles. Furthermore, the headlight guards have been so designed as to protect lenses from flying objects such as rocks or other loose obstacles on the road which might be thrown up by the wheels of a vehicle in advance thereof. In case of sudden impact from the front, the main frame 1 is reinforced by the front and rear supporting braces 12, 13 and 5. The forwardly extending zone of the guard has a slight spring like action designed to have a cushioning and shock absorbing effect in case of collision. Substantial protection is also afforded to the radiator and headlights in the event of collision with overhanging rear portions of trucks as commonly constructed, against which the ordinary bumper arrangements are disposed too low for protection.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a vehicle protecting device, an inverted U-shaped frame adapted to rest on the chassis, and spaced vertical elements secured to said frame, the whole having a portion extending in front of the normal plane of said device to constitute a resilient frame.

2. In a vehicle protecting device, an inverted U-shaped frame adapted to rest on the chassis, spaced vertical elements disposed across said frame and secured thereto, the whole having a portion extending in front of the normal plane of said device, and bracing elements adapted to hold said device in a position substantially parallel to the front of said vehicle.

3. In a vehicle protecting device, an inverted U-shaped frame, spaced vertical and horizontal elements secured thereto, the whole having a portion extending in front of the normal plane of said device, and circular headlight guards interposed in the sides of said frame.

4. In a vehicle protecting device, an inverted U-shaped frame adapted to rest on the chassis, spaced vertical and horizontal elements secured to said frame and to each other, the whole having a portion extending in front of the normal plane of said device, the lowermost horizontal element having a portion raised from the horizontal, and rearwardly extending bracing elements adapted to hold said frame in a position substantially parallel to the front of the vehicle.

5. In a vehicle protective device, a frame comprising an arch member, side legs, and circular headlight guards arranged between said arch and legs, spaced vertical and horizontal bars secured to said frame, the guards and the bars in the horizontal zone thereof extending in front of the normal plane of the device to provide a resilient frame, and bracing elements operative to maintain the frame in substantially upright position.

6. In a vehicle protective device, a frame comprising an arch member, side legs, and circular headlight guards arranged between said arch and legs, spaced vertical and horizontal bars secured to said frame, the guards and the bars in the horizontal zone thereof extending in front of the normal plane of the device to provide a resilient frame, and forwardly and rearwardly extending bracing elements for said frame.

7. In a vehicle radiator protecting device, a plurality of interconnecting elements disposed in advance of and substantially parallel to the front of said vehicle, the whole having a portion extending in front of the normal plane of said device.

8. In a vehicle radiator protecting device, an inverted U-shaped frame disposed in advance of and substantially parallel to the front of said vehicle, a plurality of interconnecting elements secured to said frame, a portion of said frame and said elements extending in front of the normal plane of said device.

9. In a vehicle protecting device, a frame, a plurality of interconnecting vertical and horizontal elements secured to the frame and to each other, and light guards positioned in the sides of said frame, the whole having a bowed portion extending to one side of the normal vertical plane of said device.

Signed at New York, New York, this 23rd day of May, 1930.

HARRY RASKIN.